(12) United States Patent
Song

(10) Patent No.: US 10,641,517 B2
(45) Date of Patent: May 5, 2020

(54) ELECTRIC FAN CAPABLE OF CONTROLLING ROTATION RANGE AND METHOD OF CONTROLLING THE SAME

(71) Applicant: Myung Eun Song, Gwacheon-si (KR)

(72) Inventor: Myung Eun Song, Gwacheon-si (KR)

(*) Notice: Subject to any disclaimer, the term of this patent is extended or adjusted under 35 U.S.C. 154(b) by 0 days.

(21) Appl. No.: 16/038,810

(22) Filed: Jul. 18, 2018

(65) Prior Publication Data

US 2019/0025779 A1  Jan. 24, 2019

(30) Foreign Application Priority Data

Jul. 18, 2017  (KR) .......................... 10-2017-0091063

(51) Int. Cl.
| | | |
|---|---|---|
| *F24F 11/79* | (2018.01) | |
| *G05B 15/02* | (2006.01) | |
| *G06K 9/00* | (2006.01) | |
| *G06T 7/50* | (2017.01) | |
| *F04D 27/00* | (2006.01) | |

(Continued)

(52) U.S. Cl.
CPC .......... *F24F 11/79* (2018.01); *B60H 1/00814* (2013.01); *F04D 25/06* (2013.01); *F04D 25/105* (2013.01); *F04D 27/004* (2013.01); *F24F 1/0007* (2013.01); *F24F 11/56* (2018.01); *F24F 11/77* (2018.01); *G05B 15/02* (2013.01); *G06F 3/012* (2013.01); *G06F 3/017* (2013.01); *G06K 9/00248* (2013.01); *G06K 9/00355* (2013.01); *G06K 9/00375* (2013.01); *G06T 7/50* (2017.01); *G06T 7/70* (2017.01); *F24F 2120/12* (2018.01); *F24F 2120/14* (2018.01)

(58) Field of Classification Search
CPC .......... F24F 1/0007; F24F 11/56; F24F 11/77; F24F 11/79; F24F 2120/12; F24F 2120/14; G06F 3/017; G06K 9/00355; B60H 1/00814
See application file for complete search history.

(56) References Cited

U.S. PATENT DOCUMENTS 9,347,716 B2 * 5/2016 Matsumoto ............. F28F 27/00
9,551,541 B2 * 1/2017 Matsumoto ........... F24F 1/0007
(Continued)

FOREIGN PATENT DOCUMENTS

JP  2002-235692 A  8/2002
KR  20090115586 A  11/2009
(Continued)

OTHER PUBLICATIONS

Office action in related Korean application No. 10-2017-0091063, dated Sep. 6, 2018. 60 pages.

(Continued)

*Primary Examiner* — Crystal J Barnes-Bullock
(74) *Attorney, Agent, or Firm* — Kilpatrick Townsend & Stockton LLP

(57) ABSTRACT

An electric fan capable of controlling a rotation range and a method of controlling the same are provided. The electric fan includes a head unit including a fan or a heater; a photographing unit configured to capture an image; an image analysis unit configured to recognize at least one service target through detection of a face region from the image; and a movement control unit configured to control a movement of the head unit in a range including the at least one service target.

12 Claims, 8 Drawing Sheets

(51) Int. Cl.
 *G06T 7/70* (2017.01)
 *F04D 25/10* (2006.01)
 *F04D 25/06* (2006.01)
 *G06F 3/01* (2006.01)
 *F24F 11/77* (2018.01)
 *F24F 11/56* (2018.01)
 *F24F 1/0007* (2019.01)
 *B60H 1/00* (2006.01)
 *F24F 120/12* (2018.01)
 *F24F 120/14* (2018.01)

(56) References Cited

U.S. PATENT DOCUMENTS

| | | | |
|---|---|---|---|
| 10,012,952 B2* | 7/2018 | Uchida | G03G 15/2017 |
| 10,291,460 B2* | 5/2019 | Zhang | H04L 27/362 |
| 10,397,039 B2* | 8/2019 | Zhang | |
| 2013/0255909 A1* | 10/2013 | Matsumoto | F28F 27/00 165/11.1 |

FOREIGN PATENT DOCUMENTS

| | | |
|---|---|---|
| KR | 20140065590 A | 5/2014 |
| KR | 20160070606 A | 6/2016 |
| KR | 101708346 B1 | 2/2017 |
| KR | 101939721 B1 * | 1/2019 |

OTHER PUBLICATIONS

Notice of Allowance in related Korean Patent Application No. 10-2017-0091063 dated Oct. 10, 2019, 6 pages.

* cited by examiner

ELECTRIC FAN CAPABLE OF CONTROLLING ROTATION RANGE AND METHOD OF CONTROLLING THE SAME

CROSS-REFERENCE TO RELATED APPLICATION

This application claims the benefit of Korean Patent Application No. 10-2017-0091063, filed on Jul. 18, 2017, in the Korean Intellectual Property Office, the disclosure of which is incorporated herein in its entirety by reference.

BACKGROUND

1. Field

One or more embodiments relate to a general electric fan for outputting wind through an electric fan or a hot electric fan for outputting heat through a electric heater (hereinafter, both the general electric fan and the hot electric fan are referred to as an 'electric fan'), and more particularly, an electric fan capable of controlling a rotation range according to a person nearby and a method of controlling the same.

2. Description of the Related Art

Generally, a general electric fan for outputting wind through an electric fan as shown in FIG. 1 or a hot electric fan for outputting heat through a electric heater as shown in FIG. 2 rotates within a certain angle, and thus when a person is out of a position, wind or heat may not be supplied. KR 10-1708346 discloses a device for adjusting a left and right rotation angle of an electric fan. Even in this case, a user must be within a range of the rotation angle of the electric fan, and when it is located beyond the range, it is inconvenient for the user to directly adjust a position of the electric fan.

SUMMARY

One or more embodiments include an electric fan capable of controlling a rotation range to provide a service by automatically recognizing people located nearby without having to turn the electric fan itself.

Additional aspects will be set forth in part in the description which follows and, in part, will be apparent from the description, or may be learned by practice of the presented embodiments.

According to one or more embodiments, an electric fan includes a head unit including a fan or a heater; a photographing unit configured to capture an image; an image analysis unit configured to recognize at least one service target through detection of a face region from the image; and a movement control unit configured to control a movement of the head unit in a range including the at least one service target.

According to one or more embodiments, a method of controlling an electric fan, the method includes capturing an image around a head unit including a fan or a heater; recognizing at least one service target through detection of a face region from the image; and controlling a movement of the head unit in a range including the at least one service target.

BRIEF DESCRIPTION OF THE DRAWINGS

These and/or other aspects will become apparent and more readily appreciated from the following description of an embodiments, taken in conjunction with the accompanying drawings in which.

DETAILED DESCRIPTION

Figure 1:
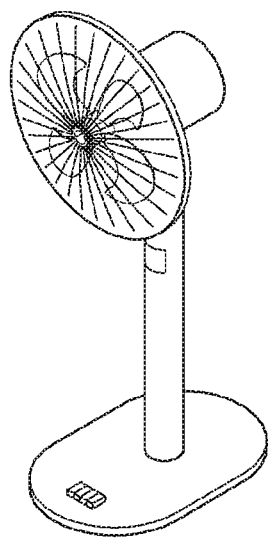
FIGS. 1 and 2 are diagrams showing examples of an appearance of an electric fan according to the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, embodiments are merely described below, by referring to the figures, to explain aspects of the present description.

Figure 2:
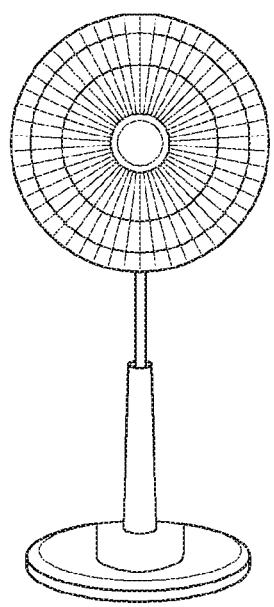

Hereinafter, an electric fan capable of controlling a rotation range according to an embodiment and a method of controlling the same will be described in detail with reference to the accompanying drawings. In the following embodiments, the term 'electric fan' is not limited to the term and is not limited to an electric fan having a round head portion as shown in FIGS. 1 and 2 but is defined as a device of all types having a head portion sending wind or heat, etc.

Figure 3:
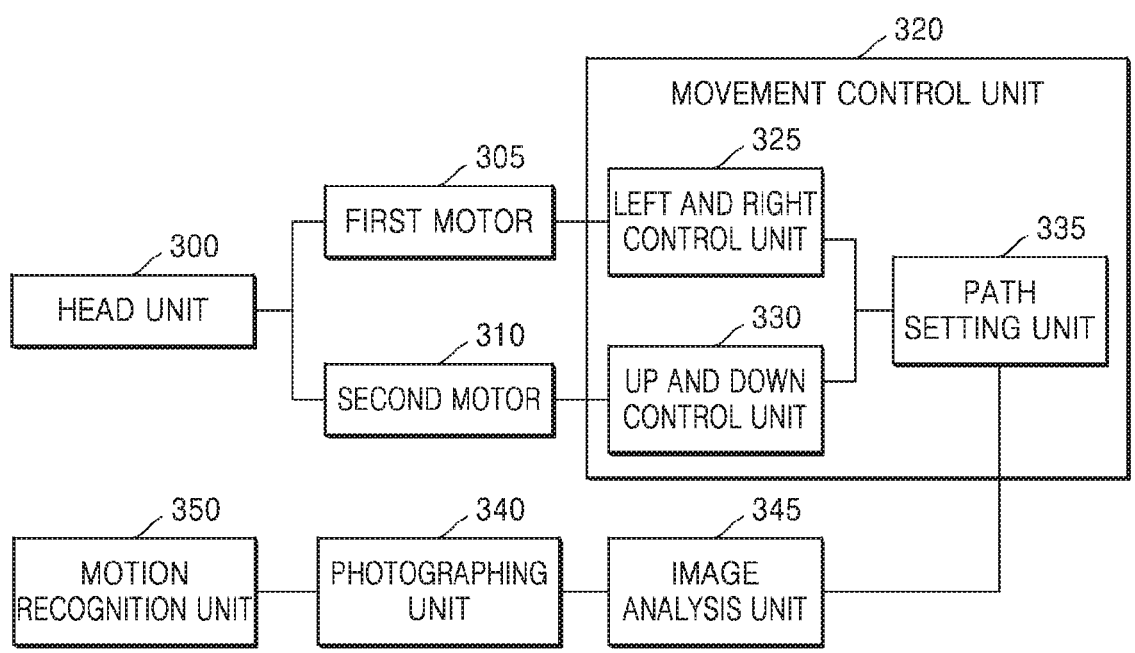
FIG. 3 is a diagram showing a configuration of an electric fan according to an embodiment.

FIG. 3 is a diagram showing a configuration of an electric fan according to an embodiment.

Referring to FIG. 3, the electric fan includes a head unit 300, a first motor 305, a second motor 310, a movement control unit 320, a photographing unit 340, an image analysis unit 345, and a motion recognition unit 350. The movement control unit 320 includes a left and right control unit 325, an up and down control unit 330, and a path setting unit 335. The electric fan may be implemented by omitting some of the elements of FIG. 3 or by adding other elements.

The head unit 300 includes a fan that generates wind or a heater that outputs heat. According to an embodiment, the head unit 300 may include the fan and the heater.

The first motor 305 and the second motor 310 move the head unit 300 left or right and up or down, respectively. For example, the first motor 305 rotates the head unit 300 in a left-right direction, and the second motor 310 rotates the head unit 300 in an up-and-down direction. Accordingly, the head unit 300 may be moved at a desired up and down and left and right angle through the control of the first motor 305 and the second motor 310. Although the present embodiment includes the first motor 305 and the second motor 310, only the first motor 305 may be used to rotate the head unit 300 only in the left and right directions, and to the contrary, only the second motor 310 may be used to move the head unit 300 up and down.

The movement control unit 320 controls the first motor 305 and the second motor 310 to move the head unit 300 to a specific position. For example, the first motor 305 and the second motor 310 are implemented as step motors, and the movement control unit 320 controls rotation angles of the first motor 305 and the second motor 310 through Pulse Width Modulation (PWM).

More specifically, the movement control unit 320 may include the left and right control unit 325 for controlling left and right movement of the first motor 305 and the up and down control unit 330 for controlling up and down movement of the second motor 310. According to an embodiment, when the electric fan includes only the first motor 305, the up and down control unit 330 may be omitted, and when the electric fan includes only the second motor 310, the left and right control unit 325 may be omitted.

The movement control unit 320 may include a path setting unit 335 for setting a movement path of the head unit 300. The path setting unit 335 sets an optimal movement path of the head unit 300 so that wind, heat, and the like may be evenly distributed to persons located around the electric fan. Examples of the path setting unit 335 will be described again with reference to FIGS. 7 to 9.

The photographing unit 340 captures an image around the electric fan. The photographing unit 340 may be a camera having a predetermined angle of view or a 360-degree camera capable of capturing the image at 360 degrees. The photographing unit 340 may also be located at one side of the head unit 300 to rotate together with the head unit 300 or may be located at one side of a main body (not shown).

For example, the photographing unit 340 may include four cameras having an angle of view of 90 degrees arranged in the main body at an interval of 90 degrees so as to obtain a 360-degree image around the electric fan. In another embodiment, the photographing unit 340 may be located at one side of the head unit 300 to capture the 360-degree image through the camera according to a 360-degree rotation of the head unit 300. That is, when the angle of view of the camera located at the head unit 300 is 90 degrees, the photographing unit 340 may capture an image through the camera every time the head unit 300 rotates by 90 degrees to obtain the 360-degree image.

The image analysis unit 345 analyzes the image captured by the photographing unit 340 to detect a face region of a person. For example, the image analysis unit 345 may detect the face region by extracting a feature point of a person's eye or nose from the image. The image analysis unit 345 may use Open Source Computer Vision (OpenCV) for face detection. In addition, since an algorithm for detecting the face region from the image is well-known technology also used in a conventional digital camera or smartphone camera, the present embodiment may use various conventional methods of detecting the face region.

The image analysis unit 345 identifies the face region detected from the image as a service target and determines where the service target is located in a 360-degree direction around the electric fan. The image analysis unit 345 may recognize one more face region detected from the image as the service target. However, a person who is far away from the electric fan may be excluded from the service target since wind or heat is not well transferred to the person.

To recognize only a person located within a certain distance from the electric fan as the service target, the present embodiment may include an element for grasping a distance between the electric fan and a person detected through image analysis. For example, the electric fan may include an ultrasonic sensor (not shown) or an infrared sensor (not shown) capable of measuring the distance. Since these sensors may be capable of measuring a distance from the electric fan to a person in front, a plurality of sensors may be located to measure distances from the electric fan to persons located in all directions or may be located at the head unit 300 to rotate with the head unit 300 and measure distances from the electric fan to each person. Alternatively, the sensor may be implemented as a kind of radar to determine positions of persons located in all directions.

Figure 5:
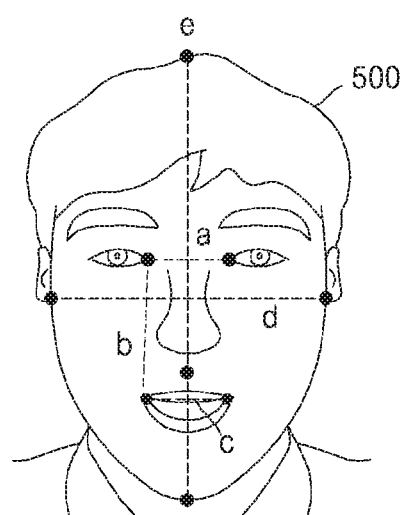
FIG. 5 is a diagram illustrating an example of a method of estimating a distance between an electric fan and a face region, according to an embodiment.

In another embodiment, the image analysis unit 345 may estimate a distance from the electric fan to the person detected from the image based on the size of the face region, as shown in FIG. 5. The distance between the person and the electric fan may be estimated by using the fact that the size of the face region of the person appearing in the image changes according to the distance between the photographing unit 340 and the person. The present embodiment does not require a precise distance measurement but rather identifies a person to be included as the service target, and thus an approximate distance may be estimated. A method of analyzing the image and estimating the distance will be described again with reference to FIG. 5.

In another embodiment, the image analysis unit 345 may further identify and store a certain region (such as a chest region) below the face region as an auxiliary image region when detecting the face region. When the person recognized as the service target through image analysis of the image analysis unit 345 turns the face to a direction opposite to the electric fan, the face region is not detected in a subsequent photographing image and may be excluded from the service target. Accordingly, after storing the auxiliary image region, when the face region is not detected at a position of the service target identified in a previous image, the image analysis unit 345 may compare a feature (e.g. a color or size of clothes, image similarity, etc.) of a previously stored auxiliary image region to the auxiliary image region detected from a current image, and, when the auxiliary image region of the previous image is similar to the auxiliary image region of the current image, determine that the service target is present as it is at the position.

The motion recognition unit 350 recognizes movement of the person through the photographing unit 340 and performs various control operations. For example, the motion recognition unit 350 may previously store a specific motion (a face direction and a specific shape and position of a hand), and then, when a motion of the person is identical to the previously stored specific motion (the number of fingers or a movement path of a hand, etc.) in the image captured by the photographing unit 340, switches a mode into an instruction recognition mode, and, when a motion in the instruction recognition mode is also identical to the previously stored motion in connection with a specific control instruction, performs the control instruction (control of the intensity of the electric fan or the heater, stop, position fixing, etc.)

In addition, the electric fan of the present embodiment may further include a display unit, various control buttons, an infrared communication module, a wireless Internet communication module, etc. The display unit may display a current state (the intensity of the electric fan or the heater) of the electric fan, temperature and humidity of air around the electric fan, a discomfort index, outdoor temperature and humidity acquired through Internet connection through the wireless Internet module, etc.

Figure 4:
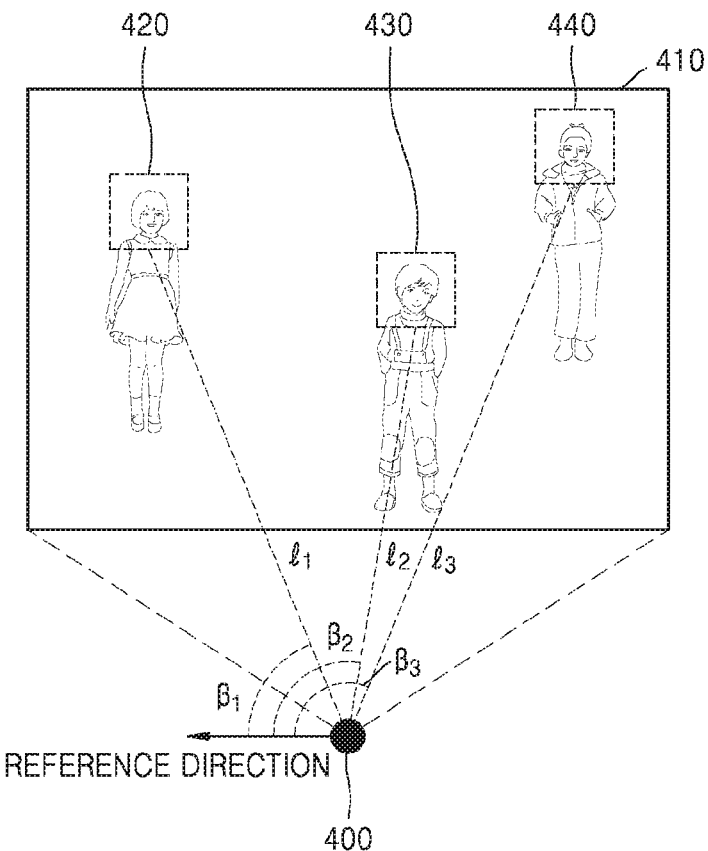
FIG. 4 is a diagram illustrating an example of face region detection according to an embodiment.

FIG. 4 is a diagram illustrating an example of face region detection according to an embodiment.

Referring to FIG. 4, an electric fan 400 analyzes a captured image to detect a face region of a person. When an angle of view of a camera is not a 360° but a certain angle α, the electric fan 400 captures a plurality of images at predetermined angular intervals so as to capture all surrounding images.

The electric fan 400 may determine angles $\beta_1$, $\beta_2$, and $\beta_3$ at which face regions 420, 430 and 440 of each captured image 410 are located from a predetermined reference direction of the electric fan 400. Further, the electric fan 400 may determine up and down angles of the face regions 420, 430, and 440 with respect to a reference height (for example, a height of the center of a head unit from the ground). The electric fan 400 may estimate distances $l_1$, $l_2$, and $l_3$ between the electric fan 400 and the face regions 420, 430, and 440 based on various sensors or face sizes of the face regions 420, 430, and 440. Accordingly, positions of the face regions 420, 430, and 440 on a three-dimensional space with respect to the electric fan 400 may be determined as shown in FIG. 6.

FIG. 5 is a diagram illustrating an example of a method of estimating a distance between an electric fan and a face region, according to an embodiment.

Referring to FIG. 5, an electric fan estimates the distance between the electric fan and the face region based on the size of a face 500 in an image or distances between various feature points of the face 500. For example, the electric fan previously determines and stores face size change information of the image captured by a camera according to the distance between the face region and the electric fan. Then, the electric fan estimates an area of the face region using various conventional image analysis algorithms or estimates a face size based on the distances between the various feature points of the face region and then estimates the distance using the previously stored face size change information according to the distance.

Figure 6:
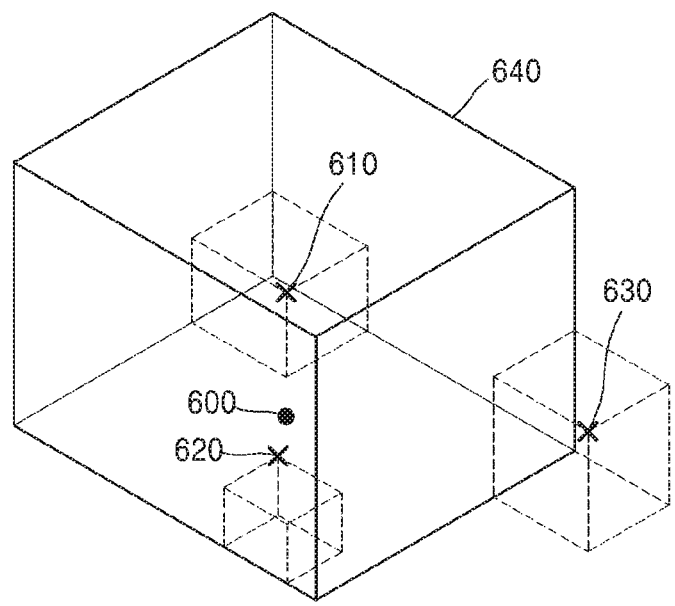
FIG. 6 is a diagram showing positions of face regions recognized through an image in a three-dimensional space according to an embodiment.

FIG. 6 is a diagram showing positions of face regions 610, 620, and 630 recognized through an image in a three-dimensional space according to an embodiment.

Referring to FIG. 6, an electric fan 600 may obtain the positions of the face regions 610, 620 and 630 in the three-dimensional space through image analysis. For example, as shown in FIG. 4, the electric fan 600 may determine which rotation angle and which up and down movement angle the face regions 610, 620 and 630 are located from a reference direction of the electric fan 600, and as shown in FIG. 5, may determine how far away the face regions 610, 620 and 630 are located from the electric fan 600 based on sizes of the face regions 610, 620 and 630 in the image.

The electric fan 600 may regard only a face region present within a predetermined distance (for example, a radius of 3 meters with respect to the electric fan 600) from the electric fan 600 as a service target. For example, in FIG. 6, the three-dimensional positions of the two face regions 610 and 620 are located within a predetermined service range 640, and the face region 630 is located beyond the service range 640, and thus the electric fan 600 recognizes only the two face regions 610 and 620 located within the service range 640 as service targets.

The service range 640 of the electric fan 600 may be a hexahedron representing a certain space as in the present embodiment or may be a spherical shape having a certain radius, and may be set in various forms according to an embodiment.

Figure 7:
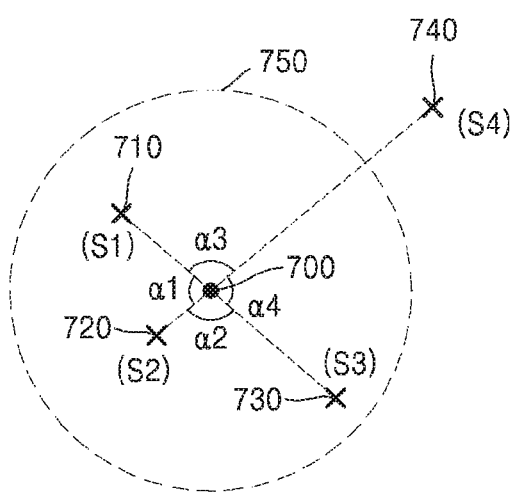
FIG. 7 is a plan view of identified service targets with respect to an electric fan according to an embodiment.

FIG. 7 is a plan view of identified service targets with respect to an electric fan 700 according to an embodiment.

Referring to FIG. 7, the electric fan 700 includes a predetermined service range 750 and recognizes only face regions 710, 720, and 730 present within the predetermined service range 750 as service targets. Then, the electric fan 700 controls a head unit to move within a range including the service targets.

The electric fan 700 may set various movement paths including all the first to third face regions 710, 720, and 730 that are the service targets. For example, the electric fan 700 may control the head unit to rotate left and right in a range $\alpha_1+\alpha_2$ of angles formed by "the first face region 710—the second face region 720—the third face region 730" or may control the head unit to rotate left and right in a range $\alpha_2+\alpha_4+\alpha_3$ of angles formed by "the second face region 720—the third face region 730—the first face region 710". In addition, various movement paths may be set.

When the movement path of the head unit is shorter, wind or heat may be provided to the service targets more quickly. Therefore, it is preferable to select a movement path that minimizes the total sum of angles between the service targets from various movement paths. Since in the present embodiment $\alpha_1<\alpha_4<\alpha_2<\alpha_3$ and the total sum of the angles formed by "the first face region 710—the second face region 720—the third face region 730" is less than the total sum of the angles of another movement path, the electric fan 700 selects this movement path.

As another example, when an internal angle between two face regions located at both ends of the movement path of the head unit is less than or equal to a certain angle, it is better that the head unit rotates 360 degrees than turning and rotating again at each end of the movement path. For example, in FIG. 7, it is assumed that a fourth face region 740 is a service target located within a service range 750, and the movement path in which the total sum of angles between the service targets is the minimum is "the first face region 710—the second face region 720—the third face region 730—the fourth face region 740". At this time, when an angle $\alpha_3$ between the first face region 710 and the fourth face region 740 is less than a predetermined angle (for example, less than 90 degrees), the electric fan 700 does not change a rotation direction in the first face region 710 or the fourth face region 740 that is an end of the movement path but moves and rotates 360 degrees. That is, the electric fan 700 may continuously rotate the head unit from the first face region 710 to the fourth face region 740 and rotate clockwise by 360 degrees.

Figure 8:
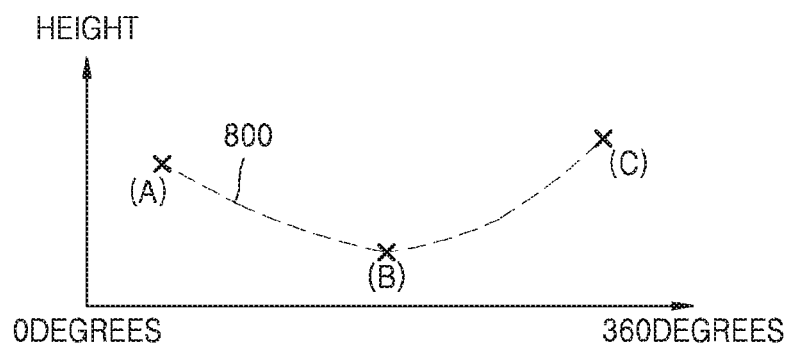
FIG. 8 is a diagram illustrating an example of setting a movement path for identified service targets according to an embodiment.

FIG. 8 is a diagram illustrating an example of setting a movement path 800 for identified service targets A, B, and C according to an embodiment.

Referring to FIG. 8, an electric fan sets the movement path 800 for controlling a head unit within a range including the service targets A, B, and C present within a service range. In the present embodiment, since the service targets A, B, and C are face regions of persons, heights of the face regions in a three-dimensional space may be different from each other.

Therefore, the electric fan may set the movement path 800 considering the heights of the service targets A, B, and C. The electric fan may set the movement path 800 linearly connecting the service targets A, B, and C or set the movement path 800 connecting the service targets A, B, and C through a cubic spline or a Bezier curve. In addition, the movement path 800 for connecting the service targets A, B, and C may be obtained through various conventional mathematical algorithms. The electric fan controls a movement of the head unit according to the movement path 800. When the head unit arrives at ends A and C of the movement path 800, the electric fan may reverse a rotation direction of the head unit and control the head unit to move up, down, left or right on the movement path 800. In another embodiment, when an angle between the service targets A and C at both ends of the movement path 800 is less than a certain angle, the electric fan may control the head unit to rotate 360 degrees without reversing the rotation direction of the head unit.

The electric fan may control a moving speed of the head unit in various ways with respect to positions of the service targets A, B, and C when controlling the movement of the head unit. For example, the electric fan may control the moving speed of the head unit to a first speed in a predetermined certain angle range (e.g. 5 degrees on both sides with respect to positions of the service targets A, B, and C) with respect to positions of the service targets A, B, and C, and may control the moving speed of the head unit to a second speed that is faster than the first speed in an angle range between the other service targets. The first speed and the second speed may be variously modified according to an embodiment.

In another embodiment, the electric fan may control intensity of the electric fan or a heater of the head unit with respect to positions of the service targets A, B, and C. For example, the electric fan may control the intensity of the electric fan or the heater of the head unit to a first intensity in the predetermined certain angle range (e.g. 5 degrees on both sides with respect to positions of the service targets A, B, and C) with respect to positions of the service targets A, B, and C, and may control the intensity of the electric fan or the heater of the head unit to a second speed (e.g. a minimum intensity) or a stop state in an angle range between the other service targets. The first intensity and the second intensity may be variously modified according to an embodiment.

Figure 9:
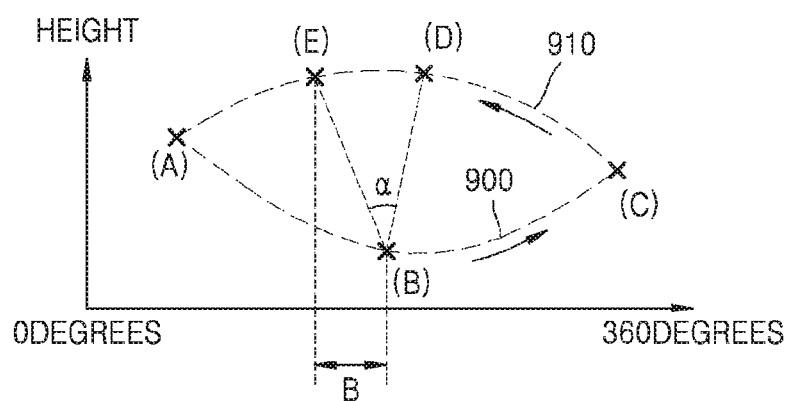
FIG. 9 is a diagram illustrating another example of setting movement paths for identified service targets according to an embodiment.

FIG. 9 is a diagram illustrating another example of setting movement paths 900 and 910 for identified service targets B, E, and D according to an embodiment.

Referring to FIG. 9, a plurality of service targets may exist within a narrow angular range at different heights. The height difference between two service targets may be longer than a predetermined distance. In this case, when an interior angle between one service target and the two adjacent service targets (for example, E-B-D) is less than a predetermined angle (for example, 60 degrees), or when an angle between two adjacent service targets (for example, E and B) is less than or equal to a predetermined angle, an electric fan sets each of the service targets (fore example, E and B) to be included in a movement path of different directions of rotation.

For example, when the interior angle α between the service target B and the two adjacent service targets E and D is less than the predetermined angle or the angle between the two service targets B and E is less than the predetermined angle, and height difference between the two service targets B and E is longer than a predetermined distance, the electric fan may set the movement paths 900 and 910 to include the service target B in the first movement path 900 of a first rotation direction and include the service targets E and D in the second movement path 910 in a second rotation direction opposite to the first rotation direction.

Figure 10:
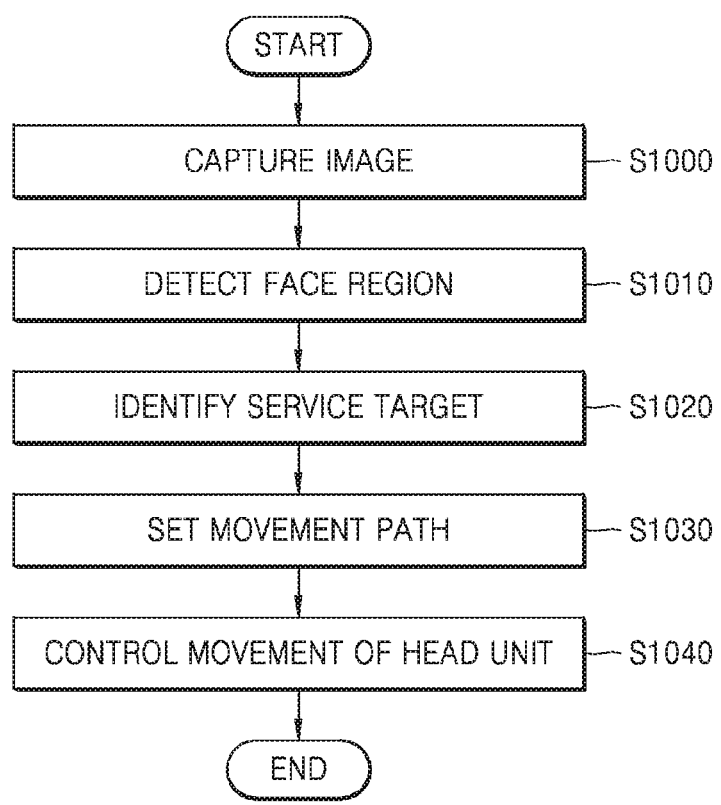
FIG. 10 is a flowchart illustrating a method of controlling an electric fan, according to an embodiment.

FIG. 10 is a flowchart illustrating a method of controlling an electric fan, according to an embodiment.

Referring to FIG. 10, the electric fan captures an image to identify a person located around 360 degrees (S1000). For example, when a camera is located at a head unit, the electric fan rotates the head unit by 360 degrees and captures at least one image considering an angle of view of the camera.

The electric fan detects a face region from the image (S1010), and recognizes a service target based on a distance between the electric fan and the face region (S1020). The electric fan sets a movement path for moving the head unit based on a three-dimensional position of the face region that is the service target (S1030). The electric fan may set the movement path for moving the head unit using methods of FIGS. 7 to 9.

For example, when there is only one service target, the electric fan may set the movement path for moving the head unit in the shape of an ellipse with respect to the service target, or may set the movement path for rotating the head unit left and right in a certain range (for example, left and right 45 degrees) with respect to the service target. When the service target does not exist around the electric fan, the electric fan may be switched to a sleep mode. In the sleep mode, a fan or a heater of the electric fan may stop or operate at a minimum intensity, and the electric fan may determine whether the service target exists by capturing an image in a 360° range around the electric fan at a predetermined time interval.

The electric fan controls movement of the head unit according to the set movement path (S1040). As described above, when controlling the movement of the head unit, the electric fan may control the speed of the head unit or the intensity of the fan or the heater differently according to whether the head unit is located near the service target.

According to an embodiment, the electric fan captures the image in the 360° range around the electric fan again at the predetermined time interval during operation using the method of FIG. 10, newly recognize a changed service target around the electric fan, set a new movement path, and control the heat unit. In this case, when the camera is installed in the head unit, since there is a disadvantage that the head unit must rotate by 360 degrees again, ignoring the movement path for a current service, a 360-degree camera capable of capturing a 360-degree image around the electric fan regardless of the rotation of the head unit may be disposed in the head unit or in a main body or a plurality of cameras may be disposed in the head unit or in the main body to obtain the 360-degree image, identify the service target from the 360-degree image, and set a new movement path. Alternatively, as in an embodiment of FIG. 11, the electric fan may recognize the existence of a new service target at a location of the service target of the existing movement path in real time and update the movement path.

Figure 11:
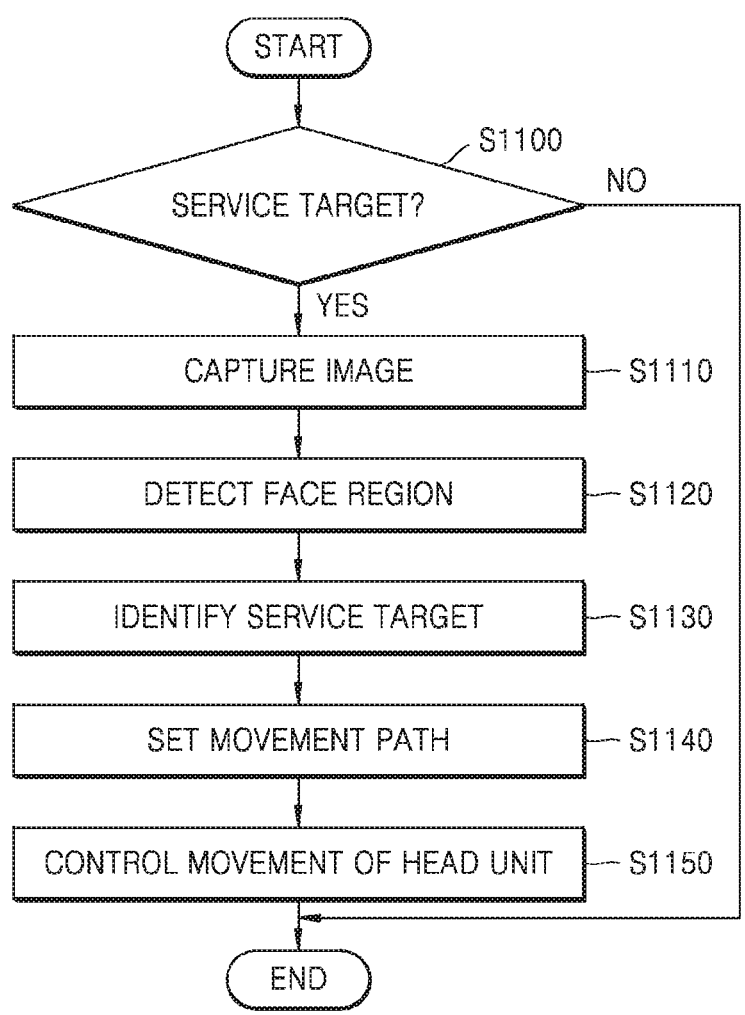
FIG. 11 is a flowchart illustrating an example of a method for resetting a real-time movement path in an electric fan control method, according to an embodiment.

FIG. 11 is a flowchart illustrating an example of a method for resetting a real-time movement path in an electric fan control method, according to an embodiment.

Referring to FIG. 11, when a head unit approaches a position of a service target on a movement path identified through the method of FIG. 10 or the like (S1100), an electric fan captures an image (S1110). At this time, since the position of the service target is a position obtained through previous image capturing, the service target may have moved to another position within a service range or may have disappeared out of the service range of the electric fan. Therefore, the electric fan captures a new image at the position of the service target identified from a previous image.

The electric fan detects a face region from the image and performs a process of recognizing the service target again (S1120 and S1130). The electric fan updates the movement path based on the newly identified service target (S1140).

For example, referring to FIG. 9, it is assumed that the service targets A, B, and C are present and the one movement path 900 is set. It is assumed that during the operation of the electric fan, the service targets D and E newly enter a service range of the electric fan, and the service target B is out of the service range. In this case, the electric fan moves along the previously set movement path 900 of A-B-C. When the head unit approaches a position of the service target B, the electric fan captures an image at a position of the service target B (S1100), detects a face region from the image and identifies the new service target D and E and the disappearance of the previous detected service target B (S1120 and S1130), and then when there is a change in the service target, reflects and updates the movement path (S1140). In the present example, since the service target B disappears and the new service targets D and E enter, the electric fan sets the movement path 910 of 'A-E-D-C' 910 reflecting the change of the service target B, D and E. As described above, whenever the head unit approaches a position of a service target in the existing movement path, the electric fan may reflect a change of the service target on the movement path through image capturing and update the movement path.

When the head unit reaches a last service target in the movement path, the electric fan recognizes the change of the service target by using the method of FIG. 11. At this time, when a new service target is found outside the last service target of the movement path, the movement path is updated to include the new service target, and the electric fan moves the head unit along a new movement path including the newly identified service target without reversing a rotation direction of the head unit in the last service target of a previous movement path (S1150). When the head unit approaches the newly identified service target, the electric fan performs a process of checking whether the service target is changed again by using the method of FIG. 11 to determine whether to update the movement path.

Figure 12:
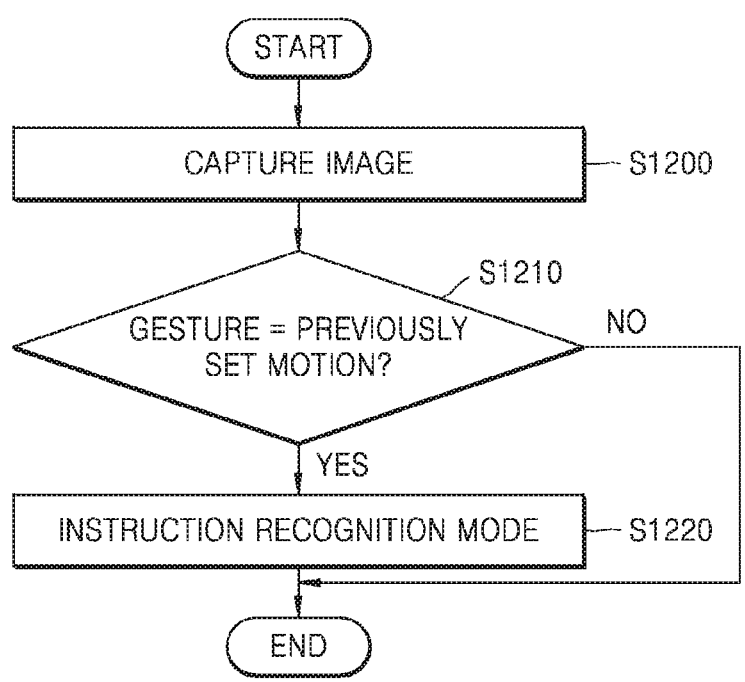
FIG. 12 is a flowchart illustrating an example of a control method using motion recognition, according to an embodiment.

FIG. 12 is a flowchart illustrating an example of a control method using motion recognition, according to an embodiment.

Referring to FIG. 12, an electric fan captures an image through a camera (S1200). When a motion of a person in the image is the same as a previously registered motion (S1210), the electric fan recognizes an instruction recognition mode (S1220). In the instruction recognition mode, the electric fan executes a corresponding control instruction when the motion of the person is the same as a motion of a previously set control instruction. When the motion is a motion of ending the previously set instruction recognition mode, the electric fan ends the instruction recognition mode.

The present disclosure may also be embodied as computer-readable code on a computer-readable recording medium. The computer-readable recording medium includes all kinds of recording apparatuses in which data that may be read by a computer system is stored. Examples of the computer-readable recording medium include ROM, RAM, CD-ROM, magnetic tape, floppy disk, optical data storage, and the like. The computer-readable recording medium may also be distributed over a networked computer system so that the computer-readable code may be stored and executed in a distributed manner.

According to the present disclosure, a conventional electric fan has an inconvenience in that a direction of an electric fan itself must be returned in order to direct a rotation range of the electric fan to where the person is located. However, the electric fan according to an embodiment may control the rotation range thereof to where the person is located without having to turn the direction of the electric fan itself. Further, the electric fan may detect a face of the person and move a head unit to a position of the face of the person, thereby further increasing the effect of cooling or heating. In addition, when the electric fan rotates and passes through a place where the person is not located, the electric fan may increase the speed of rotation, thereby quickly providing a rapid effect of cooling or heating to people. Also, when the electric fan rotates and passes through where the person is not located, the electric fan may reduce or stop the intensity of a fan or a heater, thereby reducing power consumption. Also, the electric fan may be capable of carrying out an instruction through recognition of a motion of the person, thereby pursuing convenience.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An electric fan comprising:
   a head unit comprising a fan or a heater;
   a photographing unit configured to capture an image;
   an image analysis unit configured to recognize at least one service target through detection of a face region from the image; and
   a movement control unit configured to control a movement of the head unit in a range comprising the at least one service target,
   wherein the image analysis unit is configured to estimate a distance between the electric fan and a person based on at least one interval between feature points of eyes, a nose, a mouth, or ears in the face region of the image or a size of the face region, and identify the face region that the estimated distance is within a predetermined distance as the at least one service target.

2. An electric fan comprising:
   a head unit comprising a fan or a heater;
   a photographing unit configured to capture an image;
   an image analysis unit configured to recognize at least one service target through detection of a face region from the image; and
   a movement control unit configured to control a movement of the head unit in a range comprising the at least one service target,
   wherein the image analysis unit is configured to extract and store a certain region below the face region from the image as an auxiliary image, and recognize the at least one service target based on the auxiliary image.

3. An electric fan comprising:
   a head unit comprising a fan or a heater;
   a photographing unit configured to capture an image;
   an image analysis unit configured to recognize at least one service target through detection of a face region from the image; and
   a movement control unit configured to control a movement of the head unit in a range comprising the at least one service target, wherein the movement control unit comprises:
a first control unit configured to control the head unit to move left and right using a first motor; and
a second control unit configured to control the head unit to move up and down using a second motor.

4. The electric fan of claim 3, wherein the path setting unit is configured to set the movement path to include a first service target in a first path in a first rotation direction and include a second service target in a second path in a second rotation direction opposite to the first rotation direction when an angle between the first service target and the second service target is less than a predetermined angle and height difference between the first service target and the second service target is longer than a predetermined distance.

5. An electric fan comprising:
a head unit comprising a fan or a heater;
a photographing unit configured to capture an image;
an image analysis unit configured to recognize at least one service target through detection of a face region from the image; and
a movement control unit configured to control a movement of the head unit in a range comprising the at least one service target,
wherein the control unit is configured to determine angles between the at least one service target and control a movement of the head unit within a range in which a sum of the angles between the at least one service target is minimum.

6. An electric fan comprising:
a head unit comprising a fan or a heater;
a photographing unit configured to capture an image;
an image analysis unit configured to recognize at least one service target through detection of a face region from the image; and
a movement control unit configured to control a movement of the head unit in a range comprising the at least one service target,
wherein the control unit is configured to determine angles between the at least one service target and control the head unit to rotate 360 degrees when a value at which a sum of the angles between the at least one service target is minimum is equal to or greater than a predetermined angle.

7. An electric fan comprising:
a head unit comprising a fan or a heater;
a photographing unit configured to capture an image;
an image analysis unit configured to recognize at least one service target through detection of a face region from the image; and
a movement control unit configured to control a movement of the head unit in a range comprising the at least one service target,
wherein the control unit is configured to control a moving speed of the head unit differently in a certain angle range and a remaining angle range with respect to a position of the at least one service target.

8. An electric fan comprising:
a head unit comprising a fan or a heater;
a photographing unit configured to capture an image;
an image analysis unit configured to recognize at least one service target through detection of a face region from the image; and
a movement control unit configured to control a movement of the head unit in a range comprising the at least one service target,
wherein the control unit is configured to control a rotation speed of the electric fan differently within a certain angle range around a position of each service target and a remaining angle range.

9. A method of controlling an electric fan, the method comprising:
capturing an image around a head unit comprising a fan or a heater;
recognizing at least one service target through detection of a face region from the image; and
controlling a movement of the head unit in a range comprising the at least one service target,
wherein the recognizing comprises identifying the face region that a distance between the electric fan and a person estimated based on at least one interval between feature points of eyes, a nose, a mouth, or ears in the face region of the image or a size of the face region is within a predetermined distance as the at least one service target.

10. A method of controlling an electric fan, the method comprising:
capturing an image around a head unit comprising a fan or a heater;
recognizing at least one service target through detection of a face region from the image; and
controlling a movement of the head unit in a range comprising the at least one service target,
wherein the recognizing comprises extracting and storing a certain region below the face region from the image as an auxiliary image and identifying the at least one service target based on the auxiliary image.

11. A method of controlling an electric fan, the method comprising:
capturing an image around a head unit comprising a fan or a heater;
recognizing at least one service target through detection of a face region from the image; and
controlling a movement of the head unit in a range comprising the at least one service target,
wherein the controlling comprises setting the movement path to include a first service target in a first path in a first rotation direction and include a second service target in a second path in a second rotation direction opposite to the first rotation direction when an angle between the first service target and the second service target is less than a predetermined angle and height difference between the first service target and the second service target is longer than a predetermined distance and controlling the head unit to move up and down and left and right according to the movement path.

12. A method of controlling an electric fan, the method comprising:
capturing an image around a head unit comprising a fan or a heater;
recognizing at least one service target through detection of a face region from the image; and
controlling a movement of the head unit in a range comprising the at least one service target,
wherein the controlling comprises controlling a rotation speed of the electric fan differently in a certain angle range around a position of each service target and a remaining angle range.

* * * * *